March 27, 1934.   J. YLLA-CONTE   1,952,237

LENS FOR THE CONCENTRATION OF SOLAR HEAT

Filed Nov. 18, 1931

Inventor:
J. Ylla-Conte,
by E. F. Wenderoth
Atty

Patented Mar. 27, 1934

1,952,237

UNITED STATES PATENT OFFICE 1,952,237

LENS FOR THE CONCENTRATION OF SOLAR HEAT

José Ylla-Conte, Barcelona, Spain

Application November 18, 1931, Serial No. 575,872
In Spain November 24, 1930

8 Claims. (Cl. 88—57)

My invention refers to improvements in the construction of lenses for apparatus destined to utilize solar heat, for example, for motors or furnaces in which is utilized as energy the heat of the sun concentrated by a large lens, properly mounted in a frame which allows the lens to follow the apparent movement of the sun. In this sort of apparatus the power obtained depends on the size of the lens, but in practice it is very difficult to manufacture by usual means lenses of great size, for instance, of 4 or 5 metres diameter or sometimes even of greater diameters, on account of the great difficulty in obtaining a piece of glass of these dimensions and on account of the danger of breakage during the work and handling. These difficulties are avoided by the improvements of this invention, and which consist essentially in making the lens composed of a series of pieces mounted on a frame of iron or other appropriate material. This frame is with preference made of T irons duly interjoined by means of rivets, soldering or other means, so that the wings of the T remain in the lower plane and act as a rim to serve as a rest for the parts or sections of the lens and the ribs of the T remain vertical, separating one piece of glass from the other. In the divisions of this frame are placed pieces of glass of the proper shape so that the whole form the lens.

This iron frame constitutes a certain obstacle to the passage of the solar rays and to the theoretical perfection of the lens, but if it is borne in mind that it is a question of large lenses, as stated above, and, on the other hand, to concentrate the heat for industrial purposes, it is not necessary and not even suitable, to concentrate the heat on a point constituting the perfect focus of the lens, but it is sufficient that this concentration be effected on a zone of relatively large dimensions corresponding to the dimensions of the hearth of the furnace, to the zone of heating of the motor, or of the piece to be heated, it will be readily understood that the presence of the iron frame does not, in practice, produce any obstacle to the working of the lens.

On the other hand, by employing an iron frame, according to this invention, it is very easy to obtain the lens, as it is composed only of a juxtaposition of elementary parts, which, for each annular zone of the lens, are equal to one another, so that with a reduced number of mould all the parts of a lens can be obtained.

These parts can later be ground and polished by placing them together on a frame similar to that which holds the lens and submitting all of them together to a grinding with emery and polishing as though the lens were of a single piece.

In order to diminish the weight of the glass or material of the lens, this may be made formed in echelon, so that, while keeping the proper curvature, the thickness of the lens in every one of its annular zones is reduced as much as possible.

In this case, to polish the lens, the parts forming it are placed on a staged or echelon frame so that the upper or outer face of the different elements form a spherical surface of the proper curvature.

When the elements of the lens are thus polished, they are placed on the definitive frame, which is flat in its lower face, and then the lower surface of the various elements of the lens remains in its entirety on an even plane, and the upper faces remain forming a lens in echelon.

By proceeding thus, a lens can be obtained very economically, and although it is a fact that the various annular zones, after being displaced, do not remain with their foci exactly coincident, this is of no importance, as already explained, for the concentration of heat for industrial purposes.

In the annexed drawing is shown, as an example, a lens of great dimensions, formed of several juxtaposed parts, according to the improvements which are the object of this invention, and in echelon shape.

Figure 1:
Fig. 1 is a vertical section through a diametral plane of a lens according to this invention.
Figure 2:
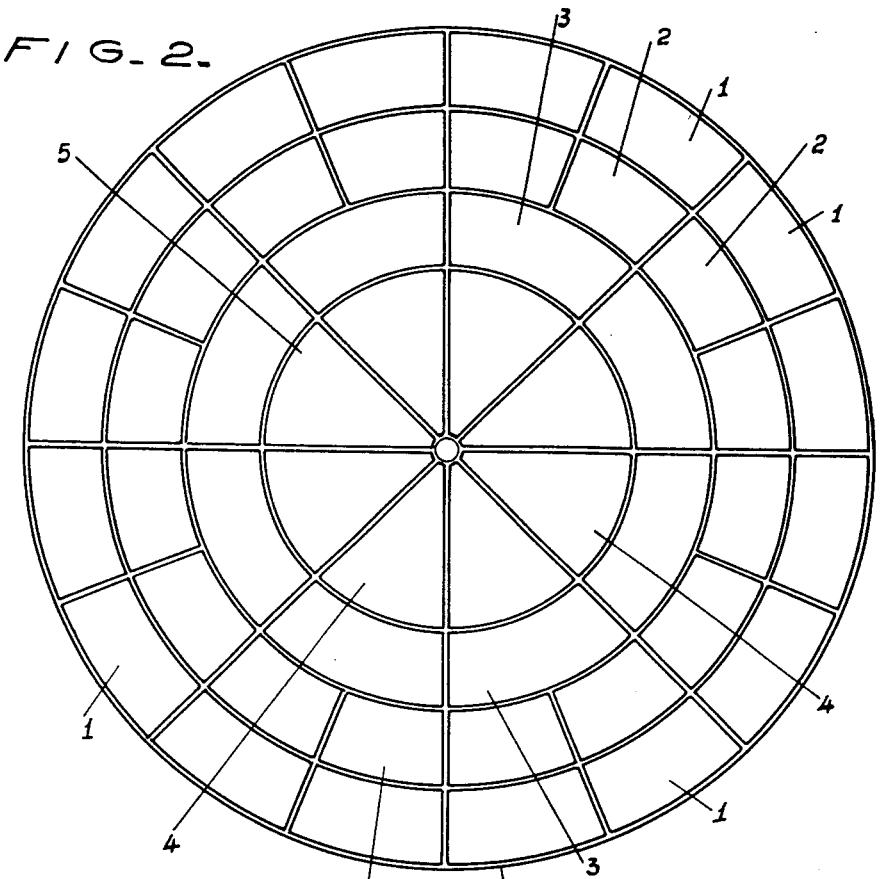
Fig. 2 is a plan view of same.

The lens figured as an example is composed of various juxtaposed pieces of molded glass forming three concentric crowns or zones, each one composed of parts 1—1—1 . . . 2—2—2 . . . 3—3—3, and a circular central part composed of parts in segment form 4—4—4 . . . All these parts are mounted on a sustaining frame 5 formed of T irons, placed with their wings downwards and situated in a horizontal plane. This frame is composed of concentric rings joined by radial irons regularly distributed forming in a whole a circular central zone and concentric annular zones, in whose divisions fit in the pieces of glass which form the lens, leaning on the wings of the irons *a* separated one from another by the ribs or cores of said irons, as shown in Figs. 1 and 2.

Thus distributed, the pieces of glass which compose the lens, have the advantage that they do not require more than four moulds for the moulding of these parts, one for the central parts and one for each series of parts corresponding to each one of the three circular zones, because the parts which comprise each zone are equal.

Figure 4:
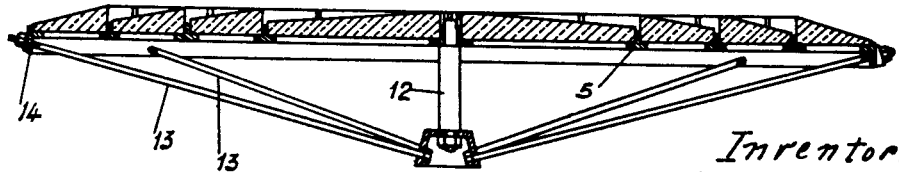
Fig. 4 shows a way of strengthening the frame of the lens.

The frame of the lens constructed as explained may easily be made of the desired resistance, but, especially in lenses of great size, it may be desirable to strengthen the frame as shown in Fig. 4, putting in its centre a stem 12 perpendicular to the plane of the frame and a series of braces 13 which go from the end of this stem to edge 14 of the frame. The stem 12 can also be lengthened in its upper part of the frame and apply another series of similar braces which start from the upper end of the stem.

Figure 3:
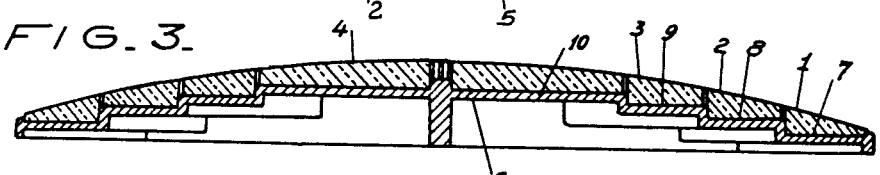
Fig. 3 shows in diametral vertical section, the manner of disposing on an auxiliary support-plate, the elemental parts of the lens so as to grind and polish same.

Treating of industrial lenses, in many cases it is not necessary to effect any work of grinding and polishing of the pieces of moulded glass, but they can be mounted on the frame just as they leave the moulds. However, the grade of precision of the lens may be improved, by grinding or polishing the surface of the parts which form it. For this object is utilized an auxiliary supporting plate 6 (Fig. 3) of cast iron or other adequate construction and of a similar structure to that of the described definitive frame. The surface of this support plate, if for lenses in echelon as in the drawing, offers annular supporting zones 7—8—9 and a central circular plane 10 all situated at different altitudes and divided by series of radial ribs so that, placing in the divisions thus formed by the ribs, the series of parts of glass 1—1—1 . . . 2—2—2 . . . 3—3—3 . . . 4—4—4 respectively in the annular zones 7—8—9 and in central plane 10 all the component parts of the lens remain forming a continuous spherical surface, like that of an ordinary flat lens, in which position they may be submitted at the same time to the operations of grinding and polishing by the appropriate processes and by help of proper machines.

For greater simplicity is shown and described a flat-convex lens, but, as is easily understood, in the same way it might be constructed bi-convex, by only giving the pieces of glass and the frame a proper form.

I claim:—

1. Lenses of large size, comprising a frame consisting of radially extending arms and substantially concentric joining members tying said arms toge'her, a spindle extending centrally downwardly from the frame, struts extending outwardly from the lower end of the said spindle to the periphery of the frame, and separate lens elements having substantially common foci, disposed in the spaces provided by the arms and members.

2. Lenses of large size, comprising a frame consisting of radially extending arms and substantially concentric joining members tying said arms together, the said arms and members being formed of material of substantially T-section, a substantially centrally disposed spindle extending downwardly from said frame, struts extending outwardly from the lower end of said spindle to the periphery of said frame, and separate lens elements having substantially common foci, disposed in the spaces provided by the arms and members.

3. Lenses of large size, comprising a substantially plane frame, consisting of radially extending arms and substantially concentric joining members tying said arms together, a substantially centrally disposed spindle extending downwardly from said frame, struts extending outwardly from the lower end of said spindle to the periphery of said frame, and separate lens elements disposed in substantially echelon fashion in the spaces provided by the arms and members, the said elements having substantially common foci.

4. Lenses of large size, comprising a frame consisting of radially extending arms and substantially concentric joining members tying said arms together, a spindle extending centrally from the frame, struts extending outwardly from the free end of the said spindle to the periphery of the frame, and separate lens elements having approximately common foci, disposed in the spaces provided by the arms and members.

5. Lenses of large size, comprising a frame consisting of radially extending arms and substantially concentric joining members tying said arms together, the said arms and members being formed of material of substantially T-section, a substantially centrally disposed spindle projecting from said frame, struts extending outwardly from the free end of said spindle to the periphery of said frame, and separate lens elements having approximately common foci, disposed in the spaces provided by the arms and members.

6. Lenses of large size, comprising a substantially plane frame, consisting of radially extending arms and substantially concentric joining members tying said arms together, a substantially centrally disposed spindle projecting from said frame, struts extending from the free end of said spindle to the periphery of said frame, and separate lens elements disposed in substantially echelon fashion in the spaces provided by the arms and members, the said elements having approximately common foci.

7. Lenses of large size for concentrating solar heat into a focal zone of large diameter, comprising a flat frame consisting of radially extending arms and substantially concentric joining members tying said arms together, the said arms and members being formed of material of substantially T-section, a substantially centrally disposed spindle projecting from said frame, struts extending outwardly from the free end of said spindle to the periphery of said frame, and separate lens elements loosely disposed in the spaces provided by the arms and members, said lens elements when in place having a focal spot of larger diameter.

8. Lenses of large size for concentrating solar heat, comprising a substantially plane frame, consisting of radially extending arms and substantially concentric joining members tying said arms together, a substantially centrally disposed spindle projecting from said frame, struts extending from the free end of said spindle to the periphery of said frame, and separate lens elements loosely disposed in substantially echelon fashion in the spaces provided by the arms and members, the said elements when in position, giving rise to a diffused focal spot of large diameter.

JOSÉ YLLA-CONTE.